United States Patent
Beko et al.

(10) Patent No.: US 10,338,193 B2
(45) Date of Patent: Jul. 2, 2019

(54) APPARATUS AND METHOD FOR RSS/AOA TARGET 3-D LOCALIZATION IN WIRELESS NETWORKS

(71) Applicants: Marko Beko, Alfragide (PT); Slavisa Tomic, Cacilhas (PT); Rui Dinis, Costa da Caparica (PT); Paulo Carvalho, Lisbon (PT)

(72) Inventors: Marko Beko, Alfragide (PT); Slavisa Tomic, Cacilhas (PT); Rui Dinis, Costa da Caparica (PT); Paulo Carvalho, Lisbon (PT)

(73) Assignee: Marko Beko, Alfragide (PT)

( * ) Notice: Subject to any disclaimer, the term of this patent is extended or adjusted under 35 U.S.C. 154(b) by 266 days.

(21) Appl. No.: 15/287,880

(22) Filed: Oct. 7, 2016

(65) Prior Publication Data
US 2018/0100915 A1    Apr. 12, 2018

(51) Int. Cl.
*G01S 5/12*    (2006.01)
*G01S 5/02*    (2010.01)

(52) U.S. Cl.
CPC ........... *G01S 5/12* (2013.01); *G01S 5/0221* (2013.01)

(58) Field of Classification Search
USPC ..................................................... 455/456.1
See application file for complete search history.

(56) References Cited

U.S. PATENT DOCUMENTS

| | | | | |
|---|---|---|---|---|
| 6,208,247 B1* | 3/2001 | Agre | ....................... | G01V 1/223 340/13.25 |
| 7,480,395 B2* | 1/2009 | Parunak | ................ | G01S 5/0263 382/103 |
| 7,941,157 B2* | 5/2011 | Srinivasan | ............ | G01S 5/0263 370/255 |
| 7,979,574 B2* | 7/2011 | Gillo | ....................... | A63F 13/31 463/1 |
| 9,749,786 B1* | 8/2017 | Pandey | ................... | H04W 4/02 |
| 2007/0293237 A1* | 12/2007 | Correal | .................. | H04W 4/02 455/456.1 |
| 2010/0265799 A1* | 10/2010 | Cevher | ................. | G01S 3/8006 367/121 |
| 2012/0326927 A1* | 12/2012 | Nikkels | ................. | H04W 84/18 342/367 |
| 2014/0062793 A1* | 3/2014 | AlSindi | ................. | G01S 5/0215 342/458 |
| 2017/0090025 A1* | 3/2017 | Wang | ....................... | G01S 7/412 |
| 2017/0280281 A1* | 9/2017 | Pandey | .................... | H04W 4/02 |
| 2017/0346559 A1* | 11/2017 | Eroglu | ................. | H04B 10/116 |

* cited by examiner

*Primary Examiner* — Jason C Olson

(57) ABSTRACT

An apparatus and a method for RSS/AoA target 3-D localization in wireless networks and wireless sensor networks (WSNs), utilizing combined measurements of received signal strength (RSS) and angle of arrival (AoA) are disclosed herein. By using the spherical coordinate conversion and available AoA observations to establish new relationships between the measurements and the unknown target location, a simple closed-form solution is developed. The method disclosed herein has a straightforward adaptation to the case where the target's transmit power is also not known. A representative set of simulations and experiments verify the potential performance improvement realized with embodiments of the method for RSS/AoA target 3-D localization in wireless networks.

4 Claims, 7 Drawing Sheets

APPARATUS AND METHOD FOR RSS/AOA TARGET 3-D LOCALIZATION IN WIRELESS NETWORKS

BACKGROUND OF THE INVENTION

Field of the Invention

The present invention relates to 3-D localization in WSN, mobile networks and wireless networks.

Description of Related Art

Wireless sensor network (WSN) generally refers to a wireless communication network which is composed of a number of devices, called sensors, allocated over a monitored region in order to measure some local quantity of interest [1]. Due to their autonomy in terms of human interaction and low device costs, WSNs find application in various areas, like event detection (fires, floods, hailstorms) [2], monitoring (industrial, agricultural, health care, environmental) [3], [4], energy efficient routing [5], exploration (deep water, underground, outer space) [6], and surveillance [7] to name a few. In many practical applications, data gathered by sensors are only relevant if they are associated with accurate sensors' locations; hence, estimation of sensors' locations is a key requirement for a majority of practical applications [1].

Sensors are small, low cost and low power nodes commonly deployed in large number over a region of interest with limited to non-existing control of their location in space, e.g., thrown out of an aeroplane for sensing in hostile environments [8]. Installing a global positioning system (GPS) receiver in each sensor would severely augment the network costs and restrict its applicability [9].

In order to maintain low implementation costs, only a small fraction of sensors are equipped with GPS receivers (called anchors), while the remaining ones (called targets) determine their locations by using a kind of localization scheme that takes advantage of the known anchor locations [10]. Since the sensors have minimal processing capabilities, the key requirement is to develop localization algorithms that are fast, scalable and abstemious in their computational and communication requirements.

Target localization has gained much attention recently due to its significance in both military and industrial applications [11, 12]. Wireless localization schemes usually rely on range measurements [13, 14], drawn from time of arrival, received signal strength (RSS), angle of arrival (AoA), or their combination.

Notable advance has been made in developing range/angle localization algorithms recently [15]-[22]. Document [15], discloses two estimators to solve the range/angle based target localization problem: linear least squares (LS) and optimization based estimators. The LS estimator is a relatively simple and well known estimator, while the optimization based estimator was solved by Davidon-Fletcher-Powell algorithm.

In document [16], an LS and a maximum likelihood (ML) estimators for a hybrid scheme that merges RSS difference (RSSD) and AoA measurements are disclosed. Non-linear constrained optimization was used to estimate the target's location from multiple RSS and AoA measurements. Both LS and ML estimators in [16] are λ-dependent, where λ is a non-negative weight assigned to regulate the contribution from RSS and AoA measurements.

Document [17] discloses a selective weighted LS (WLS) estimator for RSS/AoA localization problem. The authors determined the target location by exploiting weighted ranges from the two nearest anchor measurements, which were combined with the serving base station AoA measurement.

In document [18], an WLS estimator for 3-D RSSD/AoA localization problem is disclosed. However, the authors in [29] only investigated a small-scale WSN, with extremely low noise power.

The disclosure in [19] presents an estimator for cooperative target localization based on semidefinite programming (SDP) relaxation technique where triplets of points were used to obtain the angle measures. The authors in [19] extended their previous SDP algorithm for pure range information into a hybrid one, by adding angle information for a triplets of points. However, due to the consideration of triplets of points, the computational complexity of the SDP approach increases rather substantially with the network size.

In document [20], a second order cone relaxation technique to convert the non-convex ML estimator into a convex one is disclosed. Due to the use of more sophisticated mathematical tools, the computational complexity of the estimator in [20] grows rapidly with the network size.

Document [21] discloses two estimators for both non-cooperative and cooperative target localization. The former is based on a bisection procedure to find an exact solution to the localization problem on a computed trust region. Although computationally efficient, this estimator is executed iteratively which increases the computational load and might cause error propagation. The latter one is based on SDP relaxation, and its computational complexity is relatively high.

All of the above methods are either designed for 2-D scenarios only [16], [17], [19] and [22] or extremely low noise power [18], or employ more sophisticated mathematical tools that lead to a significant increase in the computational complexity [19]-[21]. Contrarly to these methods, the localization method disclosed in this application achives high accuracy with low computational complexity and applies to 3-D scenarios, and no noise restrictions exist as in [18].

The disclosure in [23] presents a convex optimization-based method for 2-D and 3-D localization. The method relies on pair-wise distance measurements between a target whose location is not known and an anchor whose location is known and pair-wise distance measurements between two targets whose locations are not known. The method is based on formulating a sub-problem such that a subset of both anchors and targets is included, where the subset of sensors are chosen according to the intelligent rule sets. The location estimates of the targets included in the formed subset are determined by solving an SDP representation of the derived sub-problem. The method then classifies the targets whose locations have been determined as pseudo-anchors, which are used for formulating further sub-problems. The process is repeated iteratively until all target locations are determined. Contrarily to the method disclosed in [23], the WLS method disclosed in the present application utilizes combined RSS/AoA measurements, and each target communicates with anchors exclusively. Furthermore, the WLS method disclosed in the present application provides a solution in a closed-form, which is obtained in a non-repetitive manner such that error propagation is avoided.

Document [24] discloses a hybrid localization method, where due to area conditions, one or more targets switch between different localization techniques in order to enhance the localization accuracy. This hybrid method is based on RSS measurements, and for given area conditions potentially provides the best possible localization accuracy for those conditions. Several localization techniques (e.g., ecolocation, centroid, approximate point-in-triangulation, maximum likelihood estimator and proximity) were investigated in [24], and the general idea can be easily extended to any RSS-based localization technique. In contrast to the hybrid method disclosed in [24], the WLS method disclosed in the present application is hybrid in the sense that the two radio measurements of the transmitted signal are merged, namely RSS and AoA measurements. Moreover, the method in the present disclosure does not require the specific area conditions to be known nor to solve the localization problem with other localization techniques other than the proposed WLS one.

In document [25], sensor network integration through pheromone fusion (SNIPF) that provides an end-to-end demonstration and integrates self-contained sensor/communication with novel swarming algorithms to detect foot and vehicular movement through a monitored area with minimal configuration and maintenance is disclosed. To locate the target in SNIPF, from all anchors that detect the target only the ones that recognize themselves as the closest anchors are used. These anchors then construct a gradient using a small integer (four bits in the preferred implementation) indicating their distance from the edge. A detecting anchor that hears no edge distance greater than its own knows that it is farthest from the edge; hence, it belongs to the set of the nearest anchors. Then by using the nearest anchors' locations and tactical target location, the target location is determined. Contrarily to the method in [25], the WLS method disclosed in the present application is not directly dependent on anchor density and the number of anchors that detect a given target and does not use gradients.

The disclosure in [26] provides a system having a compressive wireless array for bearing estimation of multiple acoustic sources with a plurality of sensors using a wireless channel under bandwidth constraints. It is shown in [26] that, when the source signals are unknown but incoherent, the high-rate samplers can be eliminated from all but one of the array elements by using a constrained convex optimization algorithm to perform the bearing estimation calculation. This method is important for sensor networks consisting of only arrays, since these networks can significantly outperform the average localization performance of the cheaper proximity sensors in spite of their sheer number per capita. In contrast to [26], the WLS method disclosed in the present application combines the bearing measurements (both azimuth and elevation angles) with the RSS ones.

In document [27], wireless integrated miniature sensing stations, which can be organized into a communicating network to allow sensitive detection and analysis of vibration, infrared radiation, sound, or other physical or condition change indicative of an intruder, vehicle movement, etc. is disclosed. These stations can be placed randomly in the area of interest (e.g., dropped from an aircraft or a ship) and they are programmable to localize themselves in a distributed fashion. However, in huge contrast to the disclosure in the present application, the disclosure in [27] does not provide any kind of localization algorithm for estimating the unknown stations' positions, but rather focuses on the components and characteristics of the sensing stations.

Methods and apparatus for enhancing communications transmitted via wireless mesh networks are disclosed in [28]. These networks include a number of radio nodes organized in a mesh topology, equipped with omnidirectional antennas or directional antennas to transmit large volumes of data. Contrarily to the disclosure in the present application, the disclosure in [28] focuses on network configuration to transmit data at a specific data rate and frequency range, and does not focus on localizing the radio nodes.

The RSS/AoA target 3-D localization method in wireless networks disclosed in this application merges RSS and AoA observations for both situations where $P_T$ is known or unknown. Low computational complexity and high estimation accuracy are achieved by shifting from Cartesian to spherical coordinates which allows us to establish new relationships between the measurements and the unknown target location, and results in a simple and closed-form solution. Due to its low computational complexity and upfront derivation (without resorting to convex relaxation techniques), the method provides fast and accurate solution. Simulation results validate the accuracy of the proposed method.

INFORMATION DISCLOSURE STATEMENTS

Patents and publications relevant to the patentability of the instant claims, concerning a Method for RSS/AoA target 3-D localization in wireless networks.

[1] N. Patwari. Location Estimation in Sensor Networks. Ph.D. Thesis, University of Michigan, Ann Arbor, Mich., USA, 2005.

[2] Y. Singh, S. Saha, U. Chugh, and C. Gupta, "Distributed Event Detection in Wireless Sensor Networks for Forest Fires," UKSim, pp. 634-639, April 2013.

[3] Z. Rongbai and C. Guohua, "Research on Major Hazard Installations Monitoring System Based on WSN," ICFCC, pp. V1-741-V1-745, Maz 2010.

[4] Z. Dai, S. Wang, and Z. Yan, "BSHM-WSN: A Wireless Sensor Network for Bridge Structure Health Monitoring," ICM IC, pp. 708-712, June 2012.

[5] L j. Blazevic, J. Y. Le Boudec, and S. Giordano, "A Location-based Routing Method for Mobile Ad Hoc Networks," IEEE Transactions on Mobile Computing, vol. 4, no. 2, pp. 97-110, March 2005.

[6] L. Ghelardoni, A. Ghio, and D. Anguita, "Smart Underwater Wireless Sensor Networks," IEEEI, pp. 1-5, November 2012.

[7] T. He, S. Krishnamurthy, J. A. Stankovic, T. Abdelzaher, L. Luo, R. Stoleru, T. Yan, and L. Gu, "Energy-Efficient Surveillance System Using Wireless Sensor Networks," MobiSys, pp. 1-14, June 2004.

[8] L. Buttyán and J. P. Hubaux, Security and Cooperation in Wireless Networks: Thwarting Malicious and Selfish Behavior in the Age of Ubiquitous Computing. Cambridge University Press, New York, N.Y., USA, 2007.

[9] N. Patwari, J. N. Ash, S. Kyperountas, A. O. Hero III, R. L. Moses, and N. S. Correal, "Locating the Nodes: Cooperative Localization in Wireless Sensor Networks," IEEE Sign. Process. Mag., vol. 22, no. 4, pp. 54-69, July 2005.

[10] G. Destino. Positioning in Wireless Networks: Noncooperative and Cooperative Algorithms. Ph.D. Thesis, University of Oulu, Oulu, Finland, 2012.

[11] S. Bartoletti, W. Dai, A. Conti, and M. Z. Win, "A Mathematical Model for Wideband Ranging," IEEE J. Selec. Top. Sign. Process., vol. 9, no. 2, pp. 216-228, March 2015.

[12] S. Tomic, M. Beko, and R. Dinis, "RSS-based Localization in Wireless Sensor Networks Using Convex Relaxation: Noncooperative and Cooperative Schemes," *IEEE Trans. Veh. Technol.*, vol. 64, no. 5, pp. 2037-2050, May 2015.
[13] S. Tomic, M. Beko, and R. Dinis, "Distributed RSS-AoA Based Localization with Unknown Transmit Powers," *IEEE Wirel. Commun. Letters*, vol. 5, no. 4, pp. 392-395, August 2016.
[14] D. C. Popescu and M. Hedley, "Range Data Correction for Improved Localization," *IEEE Wirel. Commun. Letters*, vol. 4, no. 3, pp. 297-300, June 2015.
[15] K. Yu, "3-D Localization Error Analysis in Wireless Networks," *IEEE Trans. Wirel. Commun.*, vol. 6, no. 10, pp. 3473-3481, October 2007.
[16] S. Wang, B. R. Jackson, and R. Inkol, "Hybrid RSS/AOA Emitter Location Estimation Based on Least Squares and Maximum Likelihood Criteria," *IEEE QBSC*, pp. 24-29, June 2012.
[17] L. Gazzah, L. Najjar, and H. Besbes, "Selective Hybrid RSS/AOA Weighting Algorithm for NLOS Intra Cell Localization," *IEEE WCNC*, pp. 2546-2551, April 2014.
[18] Y. T. Chan, F. Chan, W. Read, B. R. Jackson, and B. H. Lee, "Hybrid Localization of an Emitter by Combining Angle-of-Arrival and Received Signal Strength Measurements," *IEEE CCECE*, pp. 1-5, May 2014.
[19] P. Biswas, H. Aghajan, and Y. Ye, "Semidefinite Programming Algorithms for Sensor Network Localization Using Angle of Arrival Information," *Asilomar*, pp. 220-224, October 2005.
[20] S. Tomic, M. Marikj, M. Beko, R. Dinis, and N. Orfão, "Hybrid RSS-AoA Technique for 3-D Node Localization in Wireless Sensor Networks," *IWCMC*, pp. 1277-1282, August 2015.
[21] S. Tomic, M. Beko and R. Dinis, "3-D Target Localization in Wireless Sensor Network Using RSS and AoA Measurement," *IEEE Trans. Vehic. Technol.*, vol. PP, no 99, pp. 1, July 2016.
[22] L. Gazzah, L. Najjar, and H. Besbes, "Selective Hybrid RSS/AOA Approximate Maximum Likelihood Mobile intra cell Localization," *EW*, April 2013.
[23] U.S. Pat. No. 7,970,574 B2. Scalable Sensor Localization For Wireless Sensor Networks, June 2011.
[24] U.S. Pat. No. 7,941,157 B2. Hybrid Localization In Wireless Networks, May 2011.
[25] U.S. Pat. No. 7,480,395 B2. Decentralized Detection, Localization, And Tracking Utilizing Distributed Sensors, January 2009.
[26] U.S. Pat. No.: 2010/0265799 A1. Compressive Sensing System And Method For Bearing Estimation Of Sparse Sources In The Angle Domain, October 2010.
[27] U.S. Pat. No. 6,208,247 B1. Wireless Integrated Sensor Network Using Multiple Relayed Communications, March 2001.
[28] U.S. Pat. No.: 2012/0326927 A1. Apparatus And Method For Enhancing Wireless Mesh Network Communications, December 2012.
[29] T. S. Rappaport. *Wireless Communications: Principles and Practice*. Prentice-Hall: Upper Saddle River, N.J., USA, 1996.
[30] M. B. Ferreira, J. Gomes, and J. P. Costeira, "A Unified Approach for Hybrid Source Localization Based on Ranges and Video," *IEEE ICASSP*, pp. 2879-2883, April 2015.
[31] S. M. Kay. *Fundamentals of Statistical Signal Processing: Estimation Theory*. Prentice-Hall: Upper Saddle River, N.J., USA, 1993.

BRIEF SUMMARY OF THE INVENTION

As shown in FIG. 2 $x=[x_x, x_y, x_z]^T$ and $a_i=[a_{ix}, a_{iy}, a_{iz}]^T$ represent the coordinates of the target and the i-th anchor, respectively, while $d_i$, $\phi_i$ and $\alpha_i$ denote respectively the distance, azimuth angle and elevation angle between the target and the i-th anchor.

It is assumed that the distance is drawn from the RSS information exclusively, since ranging based on RSS does not require additional hardware [9]. The noise-free RSS between the target and the i-th anchor is defined as [29, Ch.3]

$$P_i(W) = P_T \left(\frac{d_0}{d_i}\right)^\gamma 10^{-\frac{L_0}{10}}, \text{ for } i = 1, \ldots N, \quad (1)$$

where $P_T$ is the transmit power of the target, $L_0$ is the path loss value measured at a short reference distance $d_0$ ($d_0 \leq d_i$), $\gamma$ is the path loss exponent (PLE), and $d_i$ is the distance between the target and the i-th anchor. The RSS model in (1) can be rewritten in a logarithmic form as $$P_i = P_0 - 10\gamma \log_{10} \frac{d_i}{d_0} + n_i, \text{ for } i = 1, \ldots N, \quad (2)$$

where $P_0$ is the received power (dBm) at $d_0$, and $n_i \sim N(0, \sigma_{n_i}^2)$ is the log-normal shadowing term modeled as zero-mean Gaussian random variable with variance $\sigma_{n_i}^2$. Note that $P_0$ is dependent on $P_T$.

The AoA measurements can be obtained by installing directional antenna or antenna array [15], or video cameras [30]) at anchors. Thus, by applying simple geometry, azimuth and elevation angle measurements are modeled respectively as [5]:

$$\phi_i = \tan^{-1}\left(\frac{x_y - a_{iy}}{x_x - a_{ix}}\right) + m_i, \text{ for } i = 1, \ldots N, \quad (3)$$

$$\alpha_i = \cos^{-1}\left(\frac{x_z - a_{iz}}{\|x - a_i\|}\right) + v_i, \text{ for } i = 1, \ldots N, \quad (4)$$

where $m_i \sim N(0, \sigma_{m_i}^2)$ and $v_i \sim N(0, \sigma_{v_i}^2)$ are the measurement errors of azimuth and elevation angles, respectively. Given the observation vector $\theta = [P^T, \Phi^T, \alpha^T] (\theta \in \mathbb{R}^{3N})$, where $P=[P_i]$, $\Phi=[\phi_i]$, $\alpha=[\alpha_i]$, the conditional probability density function (PDF) is given as:

$$p(\theta|x) = \prod_{i=1}^{3N} \frac{1}{\sqrt{2\pi\sigma_i^2}} \exp\left\{-\frac{(\theta_i - f_i(x))^2}{2\sigma_i^2}\right\}, \quad (5)$$

where $$f(x) = \left[P_0 - 10\gamma \log_{10} \frac{d_i}{d_0}, \tan^{-1}\left(\frac{x_y - a_{iy}}{x_x - a_{ix}}\right), \cos^{-1}\left(\frac{x_z - a_{iz}}{\|x - a_i\|}\right)\right]^T$$

and $$\sigma = [\sigma_{n_i}, \sigma_{m_i}, \sigma_{v_i}]^T.$$

The ML estimate, $\hat{x}$, of the unknown location is obtained by maximizing the log of the likelihood function (5) with respect to x [31, Ch. 7], as:

$$\hat{x} = \underset{x}{\arg\min} \sum_{i=1}^{3N} \frac{1}{\sigma_i^2} [\theta_i - f_i(x)]^2. \quad (6)$$

When the transmitted power information is known the 3-D localization method in wireless networks comprises the following steps:

First, from (2), (3) and (4) we can respectively write:

$$\lambda_i \|x - a_i\| \approx \eta d_0 \text{ for } i=1, \ldots, N, \quad (7)$$

$$c_i^T(x - a_i) \approx 0, \text{ for } i=1, \ldots, N, \quad (8)$$

$$k^T(x - a_i) \approx \|x - a_i\| \cos(\alpha_i), \text{ for } i=1, \ldots, N, \quad (9)$$

where $$\lambda_i = 10^{\frac{P_i}{10\gamma}}, \eta = 10^{\frac{P_0}{10\gamma}},$$

$c_i = [-\sin(\phi_i), \cos(\phi_i), 0]^T$ and $k = [0,0,1]^T$, and apply Cartesian to spherical coordinates conversion to write $x - a_i = r_i u_i$, where the unit vector $u_i = [\cos(\phi_i)\sin(\alpha_i), \sin(\phi_i)\sin(\alpha_i), \cos(\alpha_i)]^T$ can be obtained from the available AoA measurements;

next apply the described conversion to (7) and (9), and multiply with 1 (formed as $u_i^T u_i$), to respectively get:

$$\lambda_i u_i^T r_i u_i \approx \eta d_0 \Leftrightarrow \lambda_i u_i^T (x - a_i) \approx \eta d_0, \quad (10)$$

and $$k^T r_i u_i \approx u_i^T r_i u_i \cos(\alpha_i) \Leftrightarrow (\cos(\alpha_i) u_i - k)^T (x - a_i) \approx 0. \quad (11)$$

to give more importance to nearby links, introduce weights, $w = [\sqrt{w_i}]$, where each $w_i$ is defined as $$w_i = 1 - \frac{\hat{d}_i}{\sum_{i=1}^{N} \hat{d}_i}, \text{ with } \hat{d}_i = d_0 10^{\frac{P_0 - P_i}{10\gamma}} \quad (12)$$

being the ML estimate of the distance obtained from (2);

next according to the WLS criterion and (10), (8), (11) and (12), obtain the following estimator:

$$\hat{x} = \underset{x}{\arg\min} \sum_{i=1}^{N} w_i (\lambda_i u_i^T(x - a_i) - \eta d_0)^2 + \sum_{i=1}^{N} w_i (c_i^T(x - a_i))^2 + \sum_{i=1}^{N} w_i ((\cos(\alpha_i) u_i - k)^T(x - a_i))^2, \quad (13)$$

which can be writen as $$\underset{x}{\text{minimize}} \|W(Ax - b)\|^2, \quad (14)$$

where $W = I_3 \otimes \text{diag}(w)$, with $\otimes$ denoting the Kronecker product, and $$A = \begin{bmatrix} \vdots \\ \lambda_i u_i^T \\ \vdots \\ c_i^T \\ \vdots \\ (\cos(\alpha_i) u_i - k)^T \\ \vdots \end{bmatrix}, b = \begin{bmatrix} \vdots \\ \lambda_i u_i^T + \eta d_0 \\ \vdots \\ c_i^T a_i \\ \vdots \\ (\cos(\alpha_i) u_i - k)^T a_i \\ \vdots \end{bmatrix},$$

with the closed form solution given by $$\hat{x} = (A^T W^T W A)^{-1} (A^T W^T b). \quad (15)$$

When the transmitted power information is unknown the 3-D localization method in wireless networks comprises the following steps:

a. First, from (2), (3) and (4) we can respectively write:

$$\lambda_i \|x - a_i\| \approx \eta d_0 \text{ for } i=1, \ldots, N, \quad (7)$$

$$c_i^T(x - a_i) \approx 0, \text{ for } i=1, \ldots, N, \quad (8)$$

$$k^T(x - a_i) \approx \|x - a_i\| \cos(\alpha_i), \text{ for } i=1, \ldots, N, \quad (9)$$

where $$\lambda_i = 10^{\frac{P_i}{10\gamma}}, \eta = 10^{\frac{P_0}{10\gamma}},$$

$c_i = [-\sin(\phi_i), \cos(\phi_i), 0]^T$ and $k = [0,0,1]^T$, and apply Cartesian to spherical coordinates conversion to write $x - a_i = r_i u_i$, where the unit vector $u_i = [\cos(\phi_i)\sin(\alpha_i), \sin(\phi_i)\sin(\alpha_i), \cos(\alpha_i)]^T$ can be obtained from the available AoA measurements;

b. Next apply the described conversion to (7) and (9), and multiply with 1 (formed as $u_i^T u_i$), to respectively get:

$$\lambda_i u_i^T r_i u_i \approx \eta d_0 \Leftrightarrow \lambda_i u_i^T (x - a_i) \approx \eta d_0, \quad (10)$$

and $$k^T r_i u_i \approx u_i^T r_i u_i \cos(\alpha_i) \Leftrightarrow (\cos(\alpha_i) u_i - k)^T (x - a_i) \approx 0. \quad (11)$$

c. To give more importance to nearby links, introduce weights, $\tilde{w} = [\sqrt{\tilde{w}_i}]$, such that $$\tilde{w}_i = 1 - \frac{P_i}{\sum_{i=1}^{N} P_i}. \quad (16)$$

d. next according to the WLS criterion and (10), (8), (11) and (16), obtain $$(\hat{x}, \hat{\eta}) = \underset{x, \eta}{\arg\min} \sum_{i=1}^{N} \tilde{w}_i (\lambda_i u_i^T(x - a_i) - \eta d_0)^2 + \sum_{i=1}^{N} \tilde{w}_i (c_i^T(x - a_i))^2 + \sum_{i=1}^{N} \tilde{w}_i ((\cos(\alpha_i) u_i - k)^T(x - a_i))^2, \quad (17)$$

which can be rewritten as:

$$\underset{y = [x^T, \eta]^T}{\text{minimize}} \|\tilde{W}(\tilde{A} y - \tilde{b})\|^2, \quad (18)$$

where $\tilde{W}=I_3\otimes\text{diag}(\tilde{w})$, and $$\tilde{A} = \begin{bmatrix} \vdots & \vdots \\ \lambda_i u_i^T & -d_0 \\ \vdots & \vdots \\ c_i^T & 0 \\ \vdots & \vdots \\ (\cos(\alpha_i)u_i - k)^T & 0 \\ \vdots & \vdots \end{bmatrix}, \tilde{b} = \begin{bmatrix} \vdots \\ \lambda_i u_i^T a_i \\ \vdots \\ c_i^T a_i \\ \vdots \\ (\cos(\alpha_i)u_i - k)^T a_i \\ \vdots \end{bmatrix},$$

whose solution is given by:

$$\hat{y} = (\tilde{A}^T \tilde{W}^T \tilde{W} \tilde{A})^{-1} (\tilde{A}^T \tilde{W}^T \tilde{b}). \tag{19}$$

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF DRAWINGS

The various aspects of embodiments disclosed here, including features and advantages of the present invention outlined above are described more fully below in the detailed description in conjunction with the drawings where like reference numerals refer to like elements throughout, in which.

DETAILED DESCRIPTION OF THE INVENTION

Figure 2:
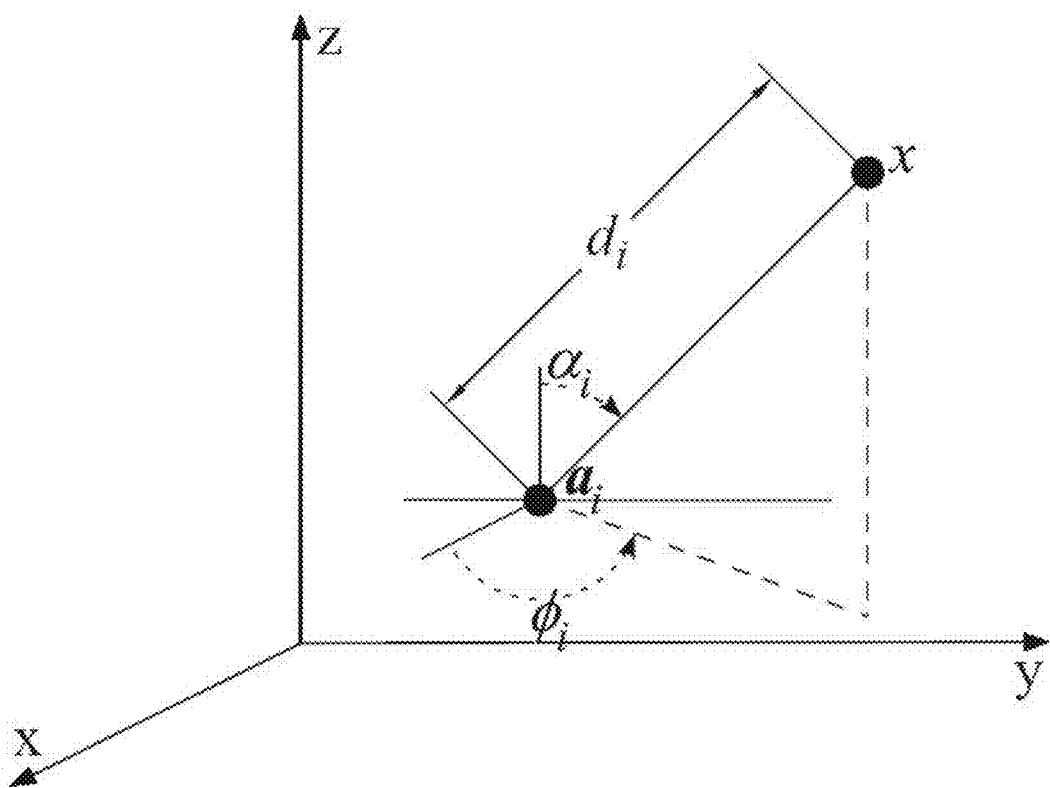
FIG. 2 shows anchor and target locations in a 3-D space where $x=[x_x,x_y,x_z]^T$ and $a_i=[a_{ix},a_{iy},a_{iz}]^T$ represent the coordinates of the target and the i-th anchor, respectively, while $d_i$, $\phi_i$ and $\alpha_i$ denote respectively the distance, azimuth angle and elevation angle between the target and the i-th anchor.

The present application describes the apparatus and a method for RSS/AoA target 3-D localization in wireless networks. Let $x\in\mathbb{R}^3$ be the unknown location of the target and $a_i\in\mathbb{R}^3$, for i=1, ..., N, be the known location of the i-th anchor. In order to determine the target's location, a hybrid system that combines range and angle measurements is employed. As shown in FIG. 2 $x=[x_x,x_y,x_z]^T$ and $a_i=[a_{ix},a_{iy},a_{iz}]^T$ represent the coordinates of the target and the i-th anchor, respectively, while $d_i$, $\phi_i$ and $\alpha_i$ denote respectively the distance, azimuth angle and elevation angle between the target and the i-th anchor.

Figure 1:
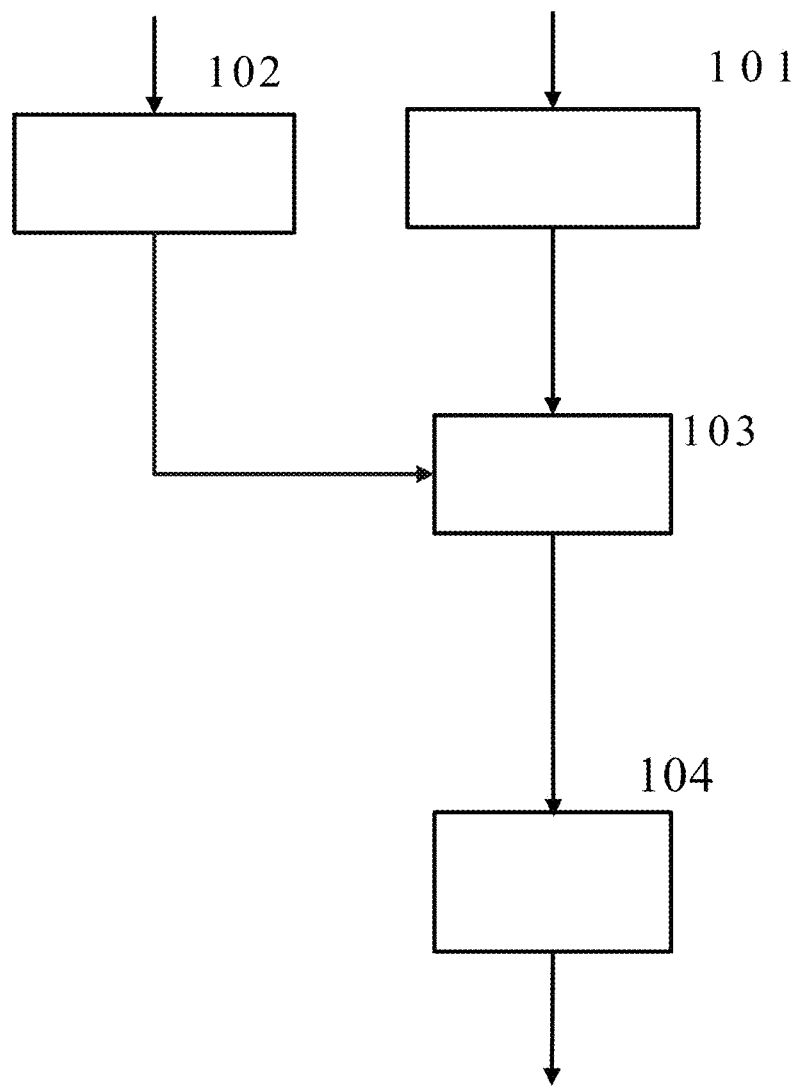
FIG. 1 is a block diagram of the geolocalization apparatus, where block 101 represents the i-th anchor receiver that receives the signal sent from the target. The receiver gives as output the received signal strength indicator (RSS). Block 102 is the i-th anchor receiver that receives the signal sent from the target and calculates the angles of azimuth and elevation, giving these values in the output. Note that anchor nodes can have multiple antennas or directional antennas to obtain AoA measurements, both azimuth angle and elevation. Block 103 is the central node where all data processing is executed (fusion center), using the readings of RSS and AoA that anchors conveyed to this node. The block 104 represents the estimator implemented by the estimation process.

The determination of the locations is done using a hybrid system that combines the distance and angle measurements obtained at the blocks 101 and 102 of FIG. 1, respectively. The combination of the two radio signal measurements provides more information for the user and is capable of improving estimation accuracy.

It is assumed that the distance is drawn in 101 from the RSS information exclusively, since ranging based on RSS does not require additional hardware [9]. The noise-free RSS between the target and the i-th anchor is defined as [29, Ch.3]

$$P_i(W) = P_T \left(\frac{d_0}{d_i}\right)^\gamma 10^{\frac{L_0}{10}}, \text{ for } i = 1, \ldots, N, \tag{1}$$

where $P_T$ is the transmit power of the target, $L_0$ is the path loss value measured at a short reference distance $d_0$ ($d_0 \le d_i$), $\gamma$ is the path loss exponent (PLE), and $d_i$ is the distance between the target and the i-th anchor. The RSS model in (1) can be rewritten in a logarithmic form as $$P_i = P_0 - 10\gamma\log_{10}\frac{d_i}{d_0} + n_i, \text{ for } i = 1, \ldots, N, \tag{2}$$

where $P_0$ is the received power (dBm) at $d_0$, and $n_i\sim N(0,\sigma_{n_i}^2)$ is the log-normal shadowing term modeled as zero-mean Gaussian random variable with variance $\sigma_{n_i}^2$. Note that $P_0$ is dependent on $P_T$. It is assumed that the sensors are static and there is no node and link failure during the computation period, and all sensors can convey their measurements to a central processor represented by block 103 of FIG. 1.

The AoA measurements performed in 102 can be obtained by installing directional antenna or antenna array [15], or video cameras [30]) at anchors. Thus, by applying simple geometry in 102, azimuth and elevation angle measurements are modeled respectively as [15]:

$$\phi_i = \tan^{-1}\left(\frac{x_y - a_{iy}}{x_x - a_{ix}}\right) + m_i, \text{ for } i = 1, \ldots, N, \tag{3}$$

$$\alpha_i = \cos^{-1}\left(\frac{x_z - a_{iz}}{\|x - a_i\|}\right) + v_i, \text{ for } i = 1, \ldots, N, \tag{4}$$

where $m_i\sim N(0,\sigma_{m_i}^2)$ and $v_i\sim N(0,\sigma_{v_i}^2)$ are the measurement errors of azimuth and elevation angles, respectively. Given the observation vector $\theta=[P^T, \Phi^T, \alpha^T]$ ($\theta \in \mathbb{R}^{3N}$), where $P=[P_i]$, $\Phi=[\phi_i]$, $\alpha=[\alpha_i]$, the conditional probability density function (PDF) is given as:

$$p(\theta | x) = \prod_{i=1}^{3N} \frac{1}{\sqrt{2\pi\sigma_i^2}} \exp\left\{-\frac{(\theta_i - f_i(x))^2}{2\sigma_i^2}\right\}, \text{ where} \quad (5)$$

$$f(x) = \left[P_0 - 10\gamma \log_{10} \frac{d_i}{d_0}, \tan^{-1}\left(\frac{x_y - a_{iy}}{x_x - a_{ix}}\right), \cos^{-1}\left(\frac{x_z - a_{iz}}{\|x - a_i\|}\right)\right]^T$$

and $$\sigma = [\sigma_{n_i}, \sigma_{m_i}, \sigma_{v_i}]^T.$$

The ML estimate, $\hat{x}$, of the unknown location is obtained by maximizing the log of the likelihood function (5) with respect to x [31, Ch. 7], as:

$$\hat{x} = \operatorname*{argmin}_{x} \sum_{i=1}^{3N} \frac{1}{\sigma_i^2} [\theta_i - f_i(x)]^2. \quad (6)$$

The above ML estimator (6) is non-convex and does not have a closed-form solution. The 3-D localization method in wireless networks disclosed in this application is implemented in block 103 and aproximates (6) by another estimator whose solution is given in a closed-form, and it is composed by the following steps:

$$\lambda_i \|x - a_i\| \approx \eta d_0 \text{ for } i=1, \ldots, N, \quad (7)$$

$$c_i^T(x - a_i) \approx 0, \text{ for } i=1, \ldots, N, \quad (8)$$

$$k^T(x - a_i) \approx \|x - a_i\| \cos(\alpha_i), \text{ for } i=1, \ldots, N, \quad (9)$$

where $$\lambda_i = 10^{\frac{P_i}{10\gamma}}, \eta = 10^{\frac{P_0}{10\gamma}},$$

$c_i = [-\sin(\phi_i), \cos(\phi_i), 0]^T$ and $k = [0, 0, 1]^T$, and apply Cartesian to spherical coordinates conversion to write $x - a_i = r_i u_i$, where the unit vector $u_i = [\cos(\phi_i)\sin(\alpha_i), \sin(\phi_i)\sin(\alpha_i), \cos(\alpha_i)]^T$ can be obtained from the available AoA measurements;

Next apply the described conversion in (7) and (9), and multiply with 1 (formed as $u_i^T u_i$), to respectively get:

$$\lambda_i u_i^T r_i u_i \approx \eta d_0 \Leftrightarrow \lambda_i u_i^T (x - a_i) \approx \eta d_0, \quad (10)$$

and $$k^T r_i u_i \approx u_i^T r_i u_i \cos(\alpha_i) \Leftrightarrow (\cos(\alpha_i) u_i - k)^T (x - a_i) \approx 0. \quad (11)$$

To give more importance to nearby links, introduce weights, $w = [\sqrt{w_i}]$, where each $w_i$ is defined as $$w_i = 1 - \frac{\hat{d}_i}{\sum_{i=1}^{N} \hat{d}_i}, \text{ with } \hat{d}_i = d_0 10^{\frac{P_0 - P_i}{10\gamma}} \quad (12)$$

being the ML estimate of the distance obtained from (2);

The reason for defining the weights in this manner is because both RSS and AoA short-range measurements are trusted more than long ones. The RSS measurements have constant multiplicative factor with range [9], which results in a greater error for remote links in comparison with the nearby ones. In FIG. 2, $\phi_i$ and $\hat{\phi}_i$ represent respectively the true and the measured azimuth angle between an anchor and two targets, $x_1$ and $x_2$, located along the same line, but unequally distant from the anchor. The goal is to determine the locations of the two targets based on the available information. Consequently, the location estimates of the two targets are at points $\hat{x}_1$ and $\hat{x}_2$. However, from FIG. 2, it can be seen that the estimated location of the target physically closer to the anchor ($\hat{x}_1$) is much closer to its true location than the one further away.

Next according to the WLS criterion and (10), (8), (11) and (12), obtain the following estimator:

$$\hat{x} = \operatorname*{arg\,min}_{x} \sum_{i=1}^{N} w_i (\lambda_i u_i^T (x - a_i) - \eta d_0)^2 + \quad (13)$$

$$\sum_{i=1}^{N} w_i (c_i^T (x - a_i))^2 + \sum_{i=1}^{N} w_i ((\cos(\alpha_i) u_i - k)^T (x - a_i))^2,$$

which can be writen as $$\operatorname*{minimize}_{x} \|W(Ax - b)\|^2, \quad (14)$$

where $W = I_3 \otimes \operatorname{diag}(w)$, with $\otimes$ denoting the Kronecker product, and $$A = \begin{bmatrix} \vdots \\ \lambda_i u_i^T \\ \vdots \\ c_i^T \\ \vdots \\ (\cos(\alpha_i) u_i - k)^T \\ \vdots \end{bmatrix}, b = \begin{bmatrix} \vdots \\ \lambda_i u_i^T + \eta d_0 \\ \vdots \\ c_i^T a_i \\ \vdots \\ (\cos(\alpha_i) u_i - k)^T a_i \\ \vdots \end{bmatrix},$$

with the closed form solution given by $$\hat{x} = (A^T W^T W A)^{-1} (A^T W^T b). \quad (15)$$

We label (15) as "WLS1" in the remaining text.

When the transmitted power information from block 101 is unavailable, which corresponds to not knowing $P_0$ in (2), the estimation is perfomed by the estimator of block 104 that introduces weights $\tilde{w} = [\sqrt{\tilde{w}_i}]$, such that $$\tilde{w}_i = 1 - \frac{P_i}{\sum_{i=1}^{N} P_i}. \quad (16)$$

From the WLS principle and (10), (8), (11) and (16), we get:

$$(\hat{x}, \hat{\eta}) = \operatorname*{arg\,min}_{x, \eta} \sum_{i=1}^{N} \tilde{w}_i (\lambda_i u_i^T (x - a_i) - \eta d_0)^2 + \quad (17)$$

-continued $$\sum_{i=1}^{N} \tilde{w}_i(c_i^T(x-a_i))^2 + \sum_{i=1}^{N} \tilde{w}_i((\cos(\alpha_i)u_i-k)^T(x-a_i))^2,$$

which can be rewritten as:

$$\underset{y=[x^T,\eta]^T}{\text{minimize}} \|\tilde{W}(\tilde{A}y-\tilde{b})\|^2, \quad (18)$$

where $\tilde{W}=I_3 \otimes \text{diag}(\tilde{w})$, and $$\tilde{A} = \begin{bmatrix} \vdots & \vdots \\ \lambda_i u_i^T & -d_0 \\ \vdots & \vdots \\ c_i^T & 0 \\ \vdots & \vdots \\ (\cos(\alpha_i)u_i-k)^T & 0 \\ \vdots & \vdots \end{bmatrix}, \tilde{b} = \begin{bmatrix} \vdots \\ \lambda_i u_i^T a_i \\ \vdots \\ c_i^T a_i \\ \vdots \\ (\cos(\alpha_i)u_i-k)^T a_i \\ \vdots \end{bmatrix},$$

whose solution is given by:

$$\hat{y}=(\tilde{A}^T \tilde{W}^T \tilde{W} \tilde{A})^{-1}(\tilde{A}^T \tilde{W}^T \tilde{b}). \quad (19)$$

We will refer to (19) as "WLS2" in the further text.

Assuming that K is the maximum number of steps in the bisection procedure used in [21], Table 1 provides an overview of the considered algorithms together with their worst case computational complexities.

TABLE 1

Summary of the Considered Algorithms

| Algorihm | Description | Complexity |
| --- | --- | --- |
| WLS1 | The proposed WLS for known $P_T$ | O(N) |
| WLS2 | The proposed WLS for unknown $P_T$ | O(N) |
| SOCP | The SOCP method in [10] for known $P_T$ | $O(N^{3.5})$ |
| SR-WLS | The bisection method in [11] for known $P_T$ | O(KN) |
| LS | The LS method in [5] for known $P_T$ | O(N) |

Table 1 shows that the computational complexity of the considered methods depends mainly on the network size, i.e., the total number of anchors in the network. This property is a characteristic of methods operating in a centralized manner [21], where all information is conveyed to a central processor. From Table 1, we can see that the computational complexity of the proposed methods is linear.

Performance of the proposed algorithm was verified through computer simulations. It was assumed that radio measurements were generated by using (2), (3) and (4). All sensors were deployed randomly inside a box with an edge length B=15 m in each Monte Carlo $M_c$) run. The reference distance is set to $d_0$=1 m, the reference path loss to $P_0$=−10 dBm, and the PLE was fixed to γ=2.5. However, to account for a realistic measurement model mismatch and test the robustness of the new algorithms to imperfect knowledge of the PLE, the true PLE was drawn from a uniform distribution on an interval [2.2,2.8], i.e., $\gamma_i$~U[2.2,2.8] for i=1, ..., N. For SR-WLS method in [11], K=30 is used. The performance metric used here is the root mean square error (RMSE), defined as $$RMSE = \sqrt{\sum_{i=1}^{M_c} \frac{\|x_i - \hat{x}_i\|^2}{M_c}},$$

where $\hat{x}_i$ denotes the estimate of the true target location, $x_i$, in the i-th $M_c$ run.

Figure 3:
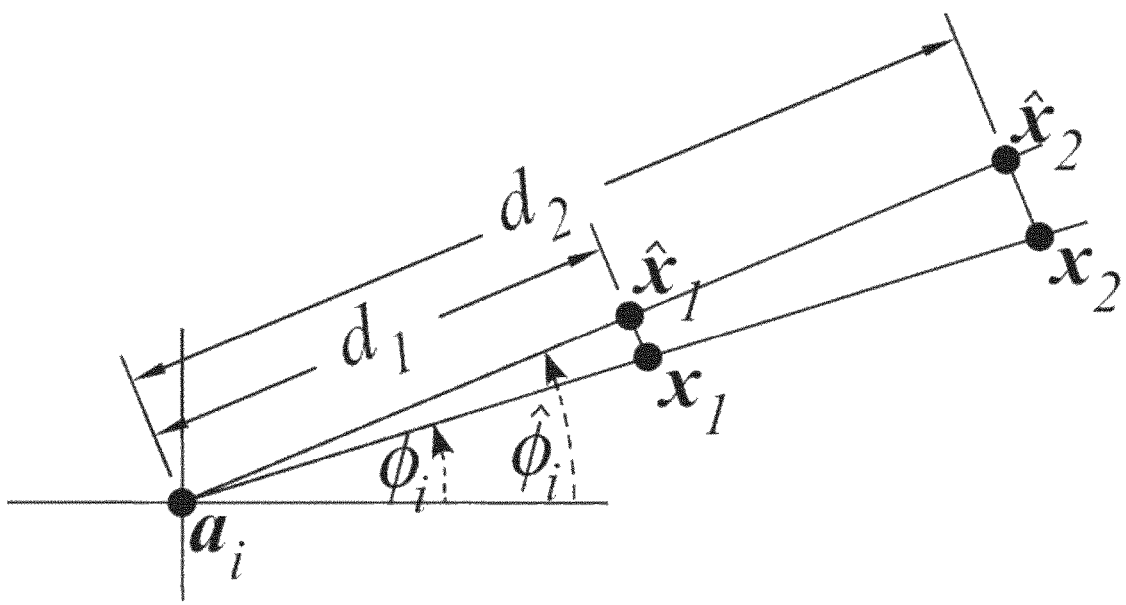
FIG. 3 shows the azimuth angle measurement error for different distances.

FIG. 3 shows that all methods benefit from additional information introduced by increasing N. Although computationally extremely light, the new method exhibits superior performance for all N, as well as the robustness to not knowing $P_T$. It is important to note that in FIG. 3 the noise powers were set to a relatively high value, and that for such a setting our method behaves exceptionally well.

Figure 4:
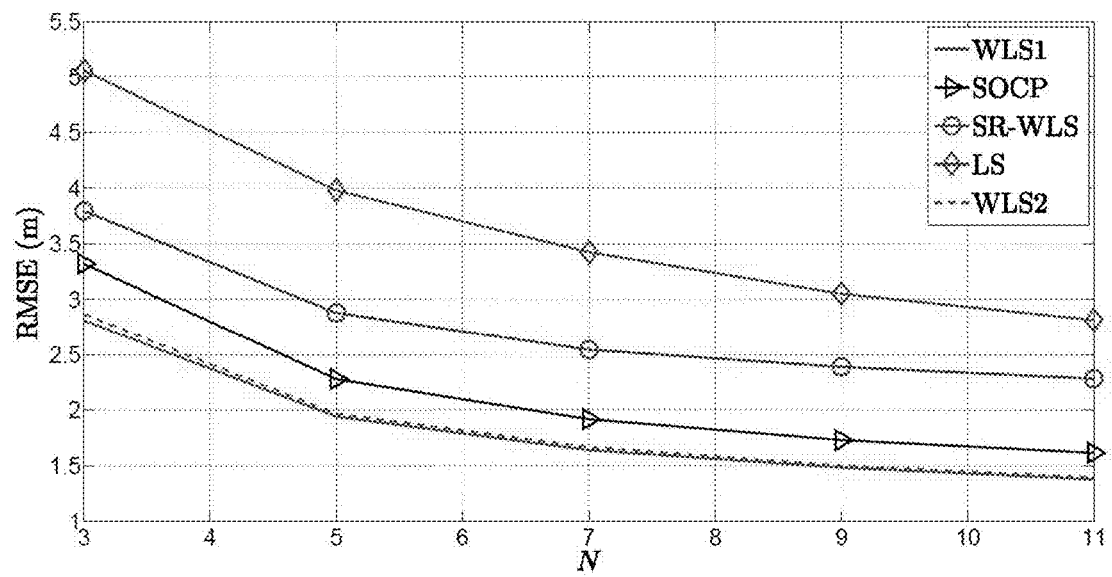
FIG. 4 shows the RMSE versus N comparison, when $\sigma_{n_i}=6$ dB, $\sigma_{m_i}=10$ deg, $\sigma_{v_i}=10$ deg. PLE is fixed to $\gamma=2.5$. However, to account for a realistic measurement model mismatch and test the robustness of the new algorithms to imperfect knowledge of the PLE, the true PLE was drawn from a uniform distribution on an interval [2.2; 2.8], i.e., $\gamma_i\sim U[2.2,2.8]$, for i=1, ..., N., $\gamma=2.5$, B=15 m, $P_0=-10$ dBm, $d_0=1$ $M_c=50000$.
Figure 5:
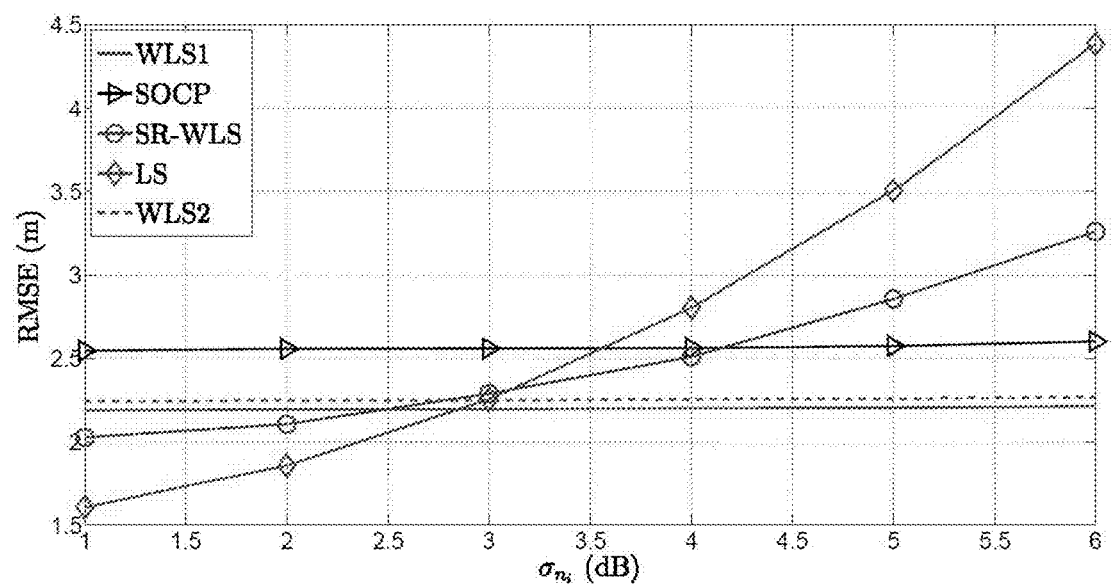
FIG. 5 shows the RMSE versus $\sigma_{n_i}$ (dB) comparison, when N=4, $\sigma_{m_i}=10$ deg, $\sigma_{v_i}=10$ deg, $\gamma_i\sim U[2.2,2.8]$, $\gamma=2.5$, B=15 m, $P_0=-10$ dBm, $d_0=1$ m, $M_c=50000$.
Figure 6:
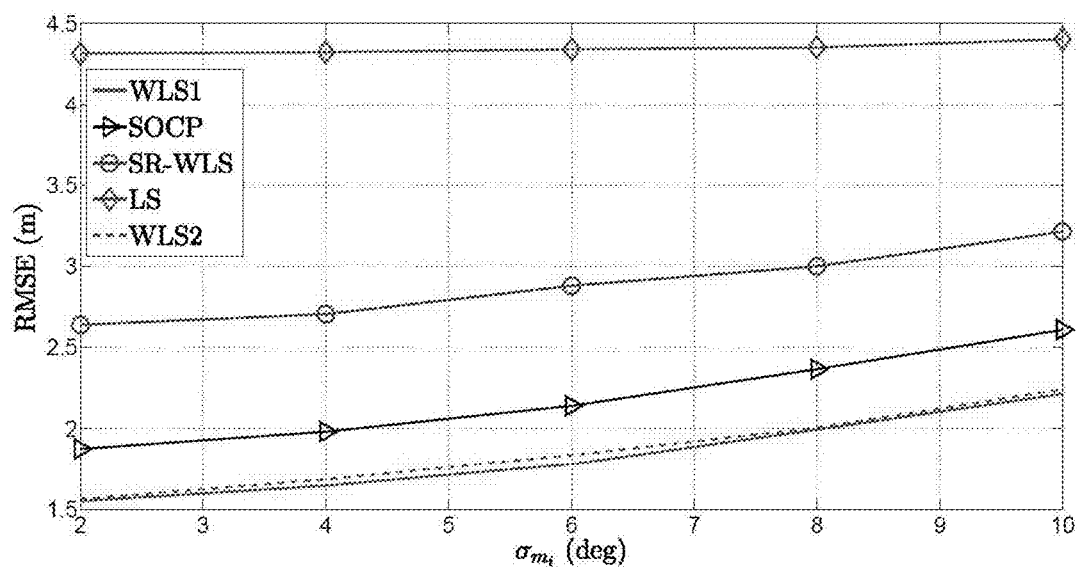
FIG. 6 shows the RMSE versus $\sigma_{m_i}$ (deg) comparison, when N=4, $\sigma_{n_i}=6$ dB, $\sigma_{v_i}=10$ deg, $\gamma_i\sim U[2.2,2.8]$, $\gamma=2.5$, B=15 m, $P_0=-10$ dBm, $d_0=1$ m, $M_c=50000$.
Figure 7:
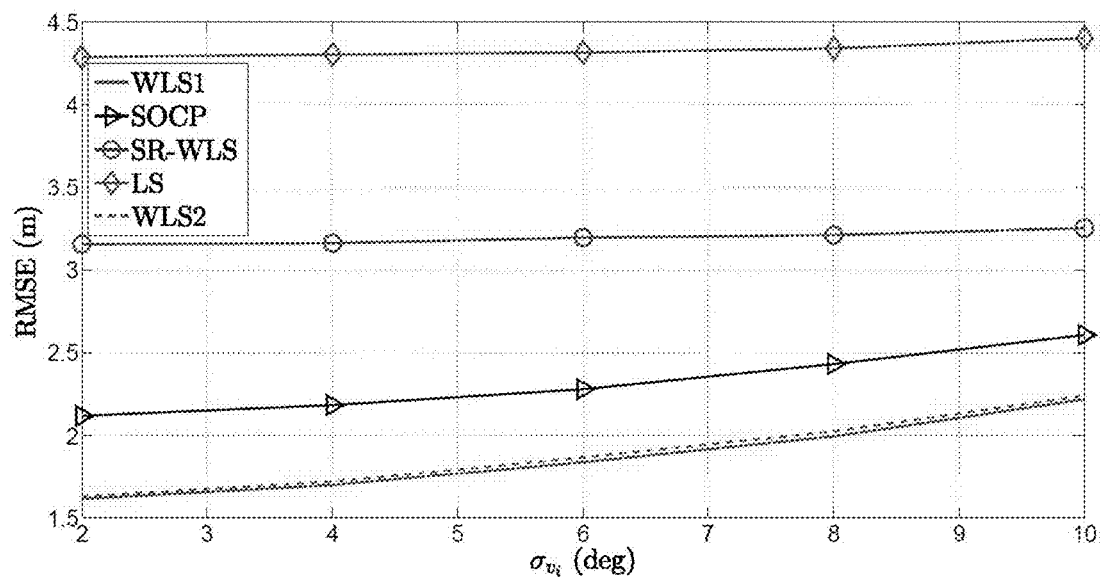
FIG. 7 shows the RMSE versus $\sigma_{v_i}$ (deg) comparison, when N=4, $\sigma_{n_i}=6$ dB, $\sigma_{m_i}=10$ deg, $\gamma_i\sim U[2.2,2.8]$, $\gamma=2.5$, B=15 m, $P_0=-10$ dBm, $d_0=1$ m, $M_c=50000$.

FIGS. 4, 5 and 6 show the quality of different types of measurements on the performance of the considered approaches. More precisely, FIGS. 4, 5 and 6 illustrate the RMSE versus $\sigma_{n_i}$ (dB), $\sigma_{m_i}$ (deg) and $\sigma_{v_i}$ (deg) comparison, respectively, for N=4. From these figures, one can observe that the performance of all methods impairs as the quality of a certain measurement drops, as expected. However, not all measurements have equal impact on the performance of the considered methods. For example, the quality of the RSS measurement has very little influence on the performance of the proposed method, while the quality of AoA measurements have greater impact on its performance. This is due to the fact that the new method relies more on the quality of angle measurements than range ones in its derivation. Nevertheless, the performance deterioration is moderate for such a wide span of noise power.

The above description of illustrated embodiments is not intended to be exhaustive or limited by the disclosure. While specific embodiments of, and examples are described herein for illustrative purposes, various equivalent modifications are possible, as those skilled in the relevant art will recognize.

What is claimed is:

1. An apparatus for target localization in wireless networks comprising:
   M targets and N anchor receivers, wherein each anchor receiver includes at least one directive or antenna array to receive a signal sent from a target;
   a processing unit configured to receive the RSS (received signal strength) information form said receivers and to process the RSS information and to compute a distance measurement between said targets and said receivers;
   a processing unit configured to receive AoA (angle of arrival) information from said receivers, wherein the AOA information includes angles of azimuth and elevation measurements of the incoming signal transmitted by each one of the targets present in the wireless network;
   a processing unit configured to compute a conversion from Cartesian coordinates of the RSS and AOA information to spherical coordinates in order to merge the RSS and AoA information; and
   an estimator configured to estimate a location of each target based on the merged RSS and AoA information and WLS (weighted least squares) criterion, wherein the WLS criterion determines weights based on a ML (maximum likelihood) estimate of the distance measurement.

2. A method for target localization in wireless networks with M targets and N anchors receivers, wherein each anchor receiver includes at least one directive or antenna array to receive a signal sent from a target comprising the following steps:

receive RSS (received signal strength) information form said receivers and process the RSS information to compute a distance measurement between said targets and said receivers;

receive AoA (angle of arrival) information from said receivers, wherein the AOA information includes angles of azimuth and elevation measurements of the incoming signal transmitted by each one of the targets present in the wireless network;

compute a conversion from Cartesian coordinates of the RSS and AoA information to spherical coordinates in order to merge the RSS and AoA information; and estimate a location of each target based on the merged RSS and AoA information and WLS (weighted least squares) criterion, wherein the WLS criterion determines weights based on a ML (maximum likelihood) estimate of the distance measurement.

3. The method of claim 2, when transmitted power information $P_T$ of each target is known, comprising the following steps:

a. define and compute the following relations:

$$\lambda_i \|x - a_i\| \approx \eta d_0 \text{ for } i=1, \ldots, N, \quad (7)$$

$$c_i^T(x - a_i) \approx 0, \text{ for } i=1, \ldots, N, \quad (8)$$

$$k^T(x - a_i) \approx \|x - a_i\| \cos(\alpha_i), \text{ for } i=1, \ldots, N, \quad (9)$$

where $$\lambda_i = 10^{\frac{P_i}{10\gamma}}, \eta = 10^{\frac{P_0}{10\gamma}},$$

$c_i = [-\sin(\phi_i), \cos(\phi_i), 0]^T$ and $k[0,0,1]^T$, $x = [x_x, x_y, x_z]^T$ and $a_i = [a_{ix}, a_{iy}, a_{iz}]^T$ represent the coordinates of the target and the i-th anchor, respectively, while $d_i$, $\phi_i$, and $\alpha_i$ denote respectively the distance, azimuth angle and elevation angle between the target and the i-th anchor, $d_0$ ($d_0 \leq d_i$) is a reference distance, $\gamma$ is the path loss exponent (PLE), and $d_i$ is the distance between the target and the i-th anchor, and convert the Cartesian to spherical coordinates write $x - a_i = r_i u_i$, where the unit vector $u_i = [\cos(\phi_i)\sin(\phi_i), \sin(\phi_i)\sin(\alpha_i), \cos(\alpha_i)]^T$ can be obtained from the AoA measurements;

b. next apply the conversion from Cartesian to spherical coordinates to (7) and (9), and multiply by 1 (formed as $u_i^T u_i$), to respectively get:

$$\lambda_i u_i^T u_i \approx \eta d_0 \Leftrightarrow \lambda_i u_i^T (x - a_i) \approx \eta d_0, \quad (10)$$

and $$k^T r_i u_i \approx u_i^T r_i u_i \cos(\alpha_i) \Leftrightarrow (\cos(\alpha_i) u_i - k)^T (x - a_i) \approx 0, \quad (11)$$

c. give more importance to nearby links by introducing weights, $w = [\sqrt{w_i}]$, where each $w_i$ is defined as $$w_i = 1 - \frac{\hat{d}_i}{\sum_{i=1}^{N} \hat{d}_i}, \text{ with } \hat{d}_i = d_0 10^{\frac{P_0 - P_i}{10\gamma}} \quad (12)$$

being the ML (maximum likelihood) estimate of the distance obtained from $$P_i = P_0 - 10\gamma \log_{10} \frac{d_i}{d_0} + n_i, \text{ for } i = 1, \ldots, N;$$

d. next according to the WLS (weighted least squares) criterion and (10), (8), (11) and (12), obtain the following estimator:

$$\hat{x} = \arg\min_x \sum_{i=1}^{N} w_i (\lambda_i u_i^T (x - a_i) - \eta d_0)^2 + \quad (13)$$

$$\sum_{i=1}^{N} w_i (c_i^T (x - a_i))^2 + \sum_{i=1}^{N} w_i ((\cos(\alpha_i) u_i - k)^T (x - a_i))^2,$$

which can be writen as $$\text{minimize}_x \|W(Ax - b)\|^2, \quad (14)$$

where $W = I_3 \otimes \text{diag}(w)$, with $\otimes$ denoting the Kronecker product, and $$A = \begin{bmatrix} \vdots \\ \lambda_i u_i^T \\ \vdots \\ c_i^T \\ \vdots \\ (\cos(\alpha_i) u_i - k)^T \\ \vdots \end{bmatrix}, b = \begin{bmatrix} \vdots \\ \lambda_i u_i^T + \eta d_0 \\ \vdots \\ c_i^T a_i \\ \vdots \\ (\cos(\alpha_i) u_i - k)^T a_i \\ \vdots \end{bmatrix},$$

with the solution given by $$\hat{x} = (A^T W^T W A)^{-1} (A^T W^T b). \quad (15)$$

4. The method of claim 2, when the transmitted power information $P_T$ of each target is unknown, comprising the following steps:

a. first, define and compute the following relations:

$$\lambda_i \|x - a_i\| \approx \eta d_0 \text{ for } i=1, \ldots, N, \quad (7)$$

$$c_i^T(x - a_i) \approx 0m \text{ for } i=1, \ldots, N, \quad (8)$$

$$k^T(x - a_i) \approx \|x - a_i\| \cos(\alpha_i), \text{ for } i=1, \ldots, N, \quad (9)$$

where $$\lambda_i = 10^{\frac{P_i}{10\gamma}}, \eta = 10^{\frac{P_0}{10\gamma}},$$

$c_i = [-\sin(\phi_i), \cos(\phi_i), 0]^T$ and $k = [0,0,1]^T$, $x = [x_x, x_y, x_z]^T$ and $a_i = [a_{ix}, a_{iy}, a_{iz}]^T$ represent the coordinates of the target and the i-th anchor, respectively, while $d_i$, $\phi_i$, and $\alpha_i$ denote respectively the distance, azimuth angle and elevation angle between the target and the i-th anchor, $\gamma$ is the path loss exponent (PLE), $d_i$ is the distance between the target and the i-th anchor, $d_0$ ($d_0 \leq d_i$) is a reference distance and, convert from Cartesian to spherical coordinates and to write $x - a_i = r_i u_i$, where the unit vector $u_i = [\cos(\phi_i)\sin(\alpha_i), \sin(\phi_i)\sin(\alpha_i), \cos(\alpha_i)]^T$ can be obtained from the AoA measurements;

b. apply the described conversion in (7) and (9), and multiply with 1 (formed as $u_i^T u_i$), to respectively get $$\lambda_i u_i^T u_i \approx \eta d_0 \Leftrightarrow \lambda_i u_i^T (x-a_i) \approx \eta d_0, \quad (10)$$

and $$k^T r_i u_i \approx u_i^T r_i u_i \cos(\alpha_i) \Leftrightarrow (\cos(\alpha_i) u_i - k)^T (x-a_i) \approx 0, \quad (11)$$

c. give more importance to nearby links by introducing weights, $\tilde{w} = [\sqrt{\tilde{w}_i}]$, such that $$\tilde{w}_i = 1 - \frac{P_i}{\sum_{i=1}^{N} P_i}; \quad (16)$$

d. apply the WLS (weighted least squares) and (10), (8), (11) and (16), to get:

$$(\hat{x}, \hat{\eta}) = \arg\min_{x,\eta} \sum_{i=1}^{N} \tilde{w}_i (\lambda_i u_i^T (x-a_i) - \eta d_0)^2 + \quad (17)$$

$$\sum_{i=1}^{N} \tilde{w}_i (c_i^T (x-a_i))^2 + \sum_{i=1}^{N} \tilde{w}_i ((\cos(\alpha_i) u_i - k)^T (x-a_i))^2,$$

which can be rewritten as:

$$\underset{y=[x^T, \eta]^T}{\text{minimize}} \|\tilde{W}(\tilde{A}y - \tilde{b})\|^2, \quad (18)$$

where $\tilde{W} = I_3 \otimes \text{diag}(\tilde{w})$, with $\otimes$ denoting the Kronecker product and $$\tilde{A} = \begin{bmatrix} \vdots & \vdots \\ \lambda_i u_i^T & -d_0 \\ \vdots & \vdots \\ c_i^T & 0 \\ \vdots & \vdots \\ (\cos(\alpha_i) u_i - k)^T & 0 \\ \vdots & \vdots \end{bmatrix}, \tilde{b} = \begin{bmatrix} \vdots \\ \lambda_i u_i^T a_i \\ \vdots \\ c_i^T a_i \\ \vdots \\ (\cos(\alpha_i) u_i - k)^T a_i \\ \vdots \end{bmatrix},$$

whose solution is given by:

$$\hat{y} = (\tilde{A}^T \tilde{W}^T \tilde{W} \tilde{A})^{-1} (\tilde{A}^T \tilde{W}^T \tilde{b}). \quad (19)$$

* * * * *